3,489,578
SODA-LIME MATERIAL FOR USE IN GLASS
MANUFACTURE
Ashley Cedric Pardoe Pugh, Northwich, England, assignor to Imperial Chemical Industries Limited, London, England, a corporation of Great Britain
No Drawing. Filed Apr. 4, 1966, Ser. No. 539,743
Claims priority, application Great Britain, May 7, 1965, 19,404/65
Int. Cl. C03c 3/02, 3/04, 1/02
U.S. Cl. 106—52          3 Claims

ABSTRACT OF THE DISCLOSURE

A process for making glass in which a vitrifiable batch comprising silica and a source of oxides of sodium and calcium is heated and melted. The source of oxides of sodium and calcium comprises a soda-lime, which is a composition of sodium hydroxide and calcium hydroxide containing available $Na_2O$ and $CaO$ in the proportions suitable for glass making, and less than 5% water, the soda-lime being made by slaking quicklime with caustic soda solution.

---

This invention relates to glass manufacture, particularly to glass based on oxides of calcium, sodium and silicon, and to the use in its manufacture of soda-lime as a source of sodium and calcium. Soda-lime is defined for the purpose of this invention as a free-flowing composition of sodium hydroxide and calcium hydroxide containing available $Na_2O$ and $CaO$ in the proportions suitable for glass making and less than about 5% of water, and made by slaking quicklime with caustic soda solutions of such strength, namely greater than 70% by weight, that the heat of hydration of the quicklime is sufficient to drive off substantially all of the water in the system not needed for hydration.

The object of the invention is to use in the glass-making process soda-lime instead of the commonly used mixture of sodium carbonate and calcium carbonate as the source of sodium and calcium. One advantage of this is that less heat is required for a given reaction rate, and another is that the high rate of reaction of soda-lime with other constituents of the batch at relatively low temperatures makes possible pre-fritting of the batch by means of low-grade heat, for example waste heat in flue gases from the glass-melting furnace.

According to our invention a process for making glass in which a vitrifiable batch comprising essentially silica and a source of oxides of sodium and calcium is heated and melted is characterised in that the source of oxides of sodium and calcium consists at least in part of soda-lime as hereinbefore defined.

A convenient way in which to make the soda-lime for the process is to stir dry quicklime having a particle size ½ inch or less with a caustic soda solution containing 70–75% by weight of NaOH, at a temperature of 75°–85° C. If desired the quicklime can be heated to 80°–100° C. The amount of caustic soda solution used must clearly be such as to provide all the water needed to hydrate the quicklime. It should also be such as to yield soda-limes in which the $Na_2O/CaO$ ratios are of the required value for making the type of glass desired. For example in a batch for a typical container glass the $Na_2O/CaO$ ratio is about 1.38 by weight. Such a ratio can be achieved in a soda-lime by slaking one part by weight of quicklime with 2.6 parts by weight of a caustic soda solution containing 73% by weight of NaOH, and the soda-lime would contain about 2% by weight of water.

In making ordinary glass the reaction consists of two main stages. In the first mixed sodium and calcium silicates are formed and in the second silica dissolves in them. The second stage is slow compared with the first, and is responsible for the time-consuming nature of the glass-making process. The use of soda-lime according to the invention affects only the first stage by enabling it to take place at temperatures lower than those in the known process using sodium carbonate and calcium carbonate, or more quickly at the same temperatures, and one might argue that by accelerating the first stage one achieves only a small decrease in the total time of glassmaking. This may be so on a small scale but in a full-scale glass-making furnace the rate of reaction is much affected by the rate of heat transfer to the interior of the batch. The thermal conductivity of the batch increases with the appearance of a liquid phase which with soda-lime is about 550° C. as against about 760° C. for sodium carbonate/calcium carbonate. In addition the lower reaction temperature in a soda-lime batch will mean that heat required for reacting material in the interior of the batch will be supplied across a greater temperature gradient than in a sodium carbonate/calcium carbonate batch and consequently at a higher rate. The use of soda-lime could thus make unnecessary the addition to the batch of such things as borax and potassium carbonate which are commonly used in this way as melting accelerators.

The effect of soda-lime on the rate of reaction in the batch is illustrated by a series of experiments whose results are summarised in Tables 1 and 2. In the experiments batches were made (a) from sand and soda-lime having an $Na_2O/CaO$ ratio of 1.38 by weight, and (b) from sand, sodium carbonate and limestone. All materials passed a No. 36 and were retained on a No. 60 British Standard sieve, and were mixed in such proportions as would give a glass containing 15% $Na_2O$, 10% $CaO$ and 75% $SiO_2$ by weight on complete reaction. In each experiment 5 g. of batch was heated in a platinum crucible suspended in an electrically heated furnace from the arm of a balance. The rate of loss of weight resulting from the loss of carbon dioxide and water is a measure of the rate of reaction. At 1000° C. and above the rate of reaction was high in both kinds of batch. At 1000° C. the reaction was 95% complete in less than one minute in the soda-lime batch and in about 7 minutes in the carbonate batch. Table 1 relates to temperatures of 800° C. and Table 2 to 600° C.

TABLE 1

| Time in minutes | Percent of reaction completed at 800° C. | |
|---|---|---|
| | Soda-lime batch (a) | Carbonate batch (b) |
| 0 | 0 | 0 |
| 1 | 32 | 2 |
| 3 | 98 | 3 |
| 5 | 100 | 7 |
| 10 | | 19 |
| 20 | | 38 |
| 30 | | 49 |
| 60 | | 55 |

TABLE 2

| Time in minutes | Percent of reaction completed at 600° C. | |
|---|---|---|
| | Soda-lime batch (a) | Carbonate batch (b) |
| 0 | 0 | 0 |
| 5 | 15 | 0 |
| 7 | 42 | 0 |
| 10 | 90 | 0 |
| 12 | 97 | 0 |

What I claim is:
1. In a process for making a substantially lime/soda glass by heating and melting a vitrifiable batch containing silica and a source of oxides of sodium and calcium, the improvement which comprises using as the source of oxides of sodium and calcium a soda-lime which is a free- flowing composition of sodium hydroxide and calcium hydroxide containing available Na$_2$O and CaO in the proportions suitable for making lime/soda glass and less than 5% by weight of water, said soda-lime being made by slaking calcium oxide with a sodium hydroxide solution containing more than 70% by weight of sodium hydroxide.

2. A process for making glass as claimed in claim 1 in which in the soda-lime the weight ratio of Na$_2$O to CaO is about 1.38.

3. A process for making a free-flowing glass-batch material suitable for lime/soda glass and consisting essentially of sodium hydroxide and calcium hydroxide and less than 5% by weight of water, the sodium and calcium hydroxides being in proportions such that the available Na$_2$O and CaO are in the proportions suitable for making a lime/soda glass comprising slaking calcium oxide with sodium hydroxide solution containing more than 70% by weight of sodium hydroxide, and allowing the heat of hydration of the calcium oxide to remove from the reaction system water not required for hydration until the total free water in the system is less than 5% by weight.

References Cited

UNITED STATES PATENTS

| | | | |
|---|---|---|---|
| 2,230,199 | 1/1941 | Dobrovolny | 106—52 |
| 2,869,985 | 1/1959 | Gooding et al. | 106—52 |
| 3,001,881 | 9/1961 | Slayter | 106—52 |

FOREIGN PATENTS 763,272   12/1956   Great Britain.

HELEN M. McCARTHY, Primary Examiner

U.S. Cl. X.R.

106—286